(12) United States Patent
Nakamura et al.

(10) Patent No.: US 12,459,423 B2
(45) Date of Patent: Nov. 4, 2025

(54) HEADLAMP CONTROL APPARATUS AND VEHICLE

(71) Applicant: SUBARU CORPORATION, Tokyo (JP)

(72) Inventors: Shunichi Nakamura, Tokyo (JP); Noriaki Asano, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 124 days.

(21) Appl. No.: 18/360,113

(22) Filed: Jul. 27, 2023

(65) Prior Publication Data

US 2024/0051457 A1 Feb. 15, 2024

(30) Foreign Application Priority Data

Aug. 9, 2022 (JP) ................................. 2022-127355

(51) Int. Cl.
*B60Q 1/14* (2006.01)

(52) U.S. Cl.
CPC ........ *B60Q 1/143* (2013.01); *B60Q 2300/112* (2013.01)

(58) Field of Classification Search
CPC .............. B60Q 1/143; B60Q 2300/112; B60Q 2300/41; B60Q 2300/42
See application file for complete search history.

(56) References Cited

U.S. PATENT DOCUMENTS

| | | | | |
|---|---|---|---|---|
| 2003/0138132 A1* | 7/2003 | Stam | ...................... | B60Q 1/085 382/104 |
| 2006/0177098 A1* | 8/2006 | Stam | ...................... | G06V 20/56 382/104 |
| 2009/0010494 A1* | 1/2009 | Bechtel | .................... | G01S 11/12 382/104 |
| 2012/0116632 A1* | 5/2012 | Bechtel | ................ | G06V 10/147 701/1 |
| 2014/0355827 A1* | 12/2014 | Ogawa | ................... | B60Q 1/143 382/103 |
| 2021/0031675 A1 | 2/2021 | Shibata et al. | | |
| 2021/0370820 A1 | 12/2021 | Shibata et al. | | |
| 2022/0136674 A1* | 5/2022 | Won | ........................ | F21S 41/33 362/466 |

FOREIGN PATENT DOCUMENTS

| | | | |
|---|---|---|---|
| WO | 2018/135356 A1 | 7/2018 | |
| WO | WO-2022202256 A1 * | 9/2022 | ............. B60Q 1/085 |

* cited by examiner

*Primary Examiner* — Abdullah A Riyami
*Assistant Examiner* — Syed M Kaiser
(74) *Attorney, Agent, or Firm* — Rimon P.C.

(57) ABSTRACT

A headlamp control apparatus for a vehicle includes a front vehicle detection unit, a speed determination unit, and a headlamp control unit. The headlamp control unit controls lighting of a headlamp, based on a detection by the front vehicle detection unit and a determination by the speed determination unit. The headlamp control unit has: a first mode of varying a region to be illuminated based on a position of a front vehicle when the front vehicle is detected, and switching to high beam when no front vehicle is detected; and a second mode of switching to low beam when the front vehicle is detected, and switching to the high beam when no front vehicle is detected. The headlamp control unit causes the control to transition to the second mode when, in the first mode, the speed determination unit determines that the vehicle's traveling speed has become less than a first speed.

5 Claims, 3 Drawing Sheets

LOW BEAM OR PASSING BEAM

HIGH BEAM OR DRIVING BEAM

ADAPTIVE DRIVING BEAM (ADB)

HEADLAMP CONTROL APPARATUS AND VEHICLE

CROSS-REFERENCE TO RELATED APPLICATIONS

The present application claims priority from Japanese Patent Application No. 2022-127355 filed on Aug. 9, 2022, the entire contents of which are hereby incorporated by reference.

BACKGROUND

The disclosure relates to a headlamp control apparatus and a vehicle.

Recent years have seen practical use of adaptive driving beam (ADB) that increases an illumination effect in a region in front of an own vehicle, and prevents, for example, a preceding vehicle or an oncoming vehicle present in the region in front of the own vehicle from being dazzled.

The adaptive driving beam checks a situation of, for example, the preceding vehicle or the oncoming vehicle, and performs control of shielding light that dazzles the preceding vehicle or the oncoming vehicle, and increases a driver's front visibility in nighttime.

For the adaptive driving beam, a technique has been proposed that, when a target is detected from an image captured by a camera, detects a position of the target, and controls a region to be illuminated with illumination light by a lamp unit, based on the detected position. For example, reference is made to International Publication No. WO 2018/135356.

SUMMARY

An aspect of the disclosure provides a headlamp control apparatus to be applied to a vehicle. The headlamp control apparatus includes a front vehicle detection unit, a speed determination unit, and a headlamp control unit. The front vehicle detection unit is configured to perform a detection of a front vehicle present in a region in front of the vehicle. The speed determination unit is configured to make a determination as to whether a traveling speed of the vehicle has become less than a first speed. The headlamp control unit is configured to perform control of lighting of a headlamp of the vehicle, based on a result of the detection by the front vehicle detection unit and a result of the determination by the speed determination unit. The headlamp control unit has a first mode and a second mode. The first mode is a mode of performing control of varying a region to be illuminated by the headlamp, based on a position of the front vehicle, when the front vehicle is detected by the front vehicle detection unit, and switching the lighting of the headlamp to high beam when the front vehicle is not detected by the front vehicle detection unit. The second mode is a mode of switching the lighting of the headlamp to low beam when the front vehicle is detected by the front vehicle detection unit, and switching the lighting of the headlamp to the high beam when the front vehicle is not detected by the front vehicle detection unit. The headlamp control unit is configured to cause the control of the lighting to transition to the second mode when, in the first mode, the speed determination unit determines that the traveling speed of the vehicle has become less than the first speed.

An aspect of the disclosure provides a vehicle including the above-described headlamp control apparatus.

An aspect of the disclosure provides a headlamp control apparatus to be applied to a vehicle. The headlamp control apparatus includes circuitry configured to: perform a front vehicle detection process of detecting a front vehicle present in a region in front of the vehicle; perform a speed determination process of determining whether a traveling speed of the vehicle has become less than a first speed; and perform control of lighting of a headlamp of the vehicle, based on a result of the front vehicle detection process and a result of the speed determination process. The circuitry has a first mode and a second mode. The first mode is a mode of performing control of varying a region to be illuminated by the headlamp, based on a position of the front vehicle, when the front vehicle is detected in the front vehicle detection process, and switching the lighting of the headlamp to high beam when the front vehicle is not detected in the front vehicle detection process. The second mode is a mode of switching the lighting of the headlamp to low beam when the front vehicle is detected in the front vehicle detection process, and switching the lighting of the headlamp to the high beam when the front vehicle is not detected in the front vehicle detection process. The circuitry is configured to, upon, in the first mode, determining in the speed determination process that the traveling speed of the vehicle has become less than the first speed, cause the control of the lighting to transition to the second mode.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
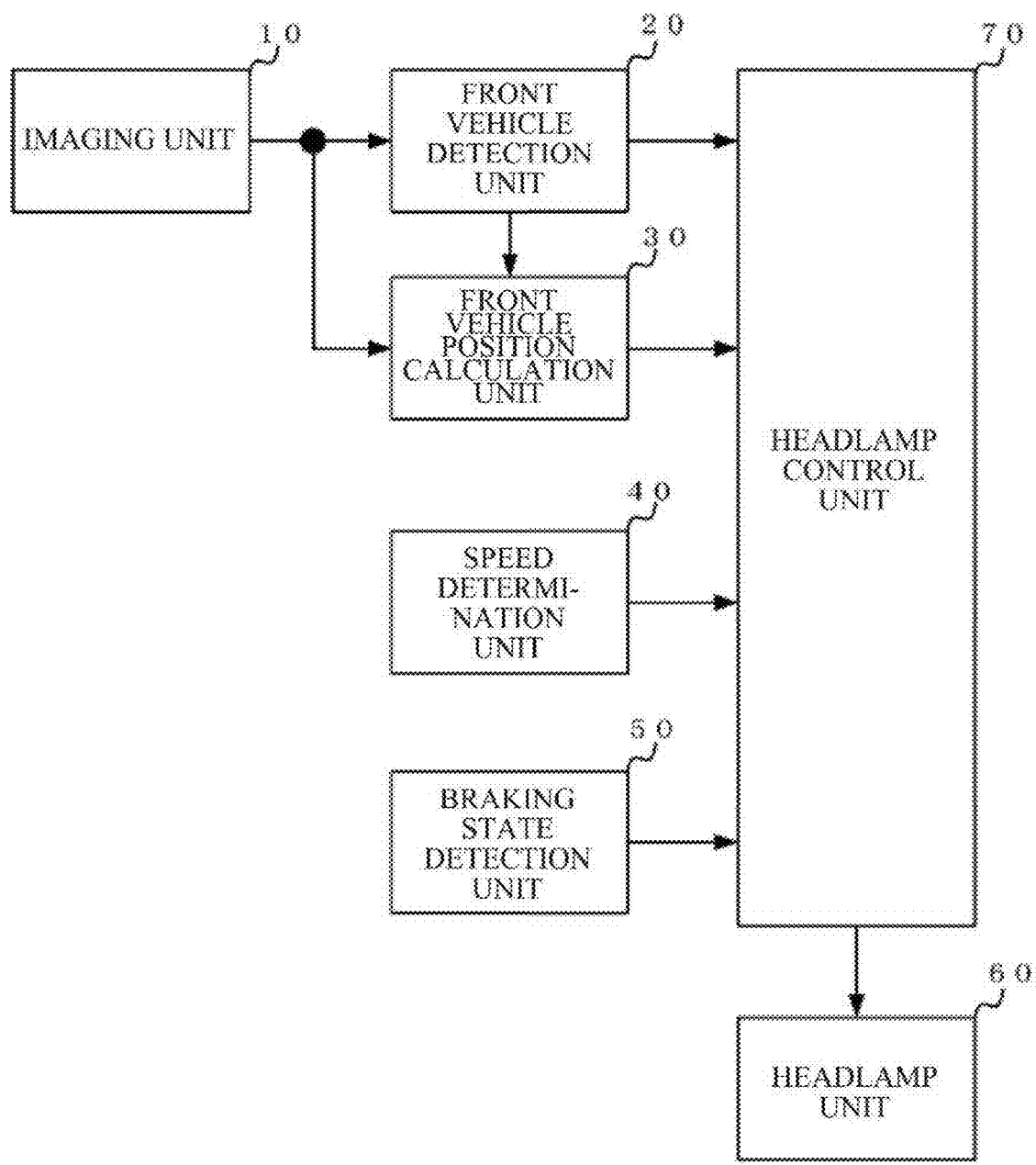
FIG. 1 is a diagram illustrating a configuration of a headlamp control apparatus according to one example embodiment of the disclosure.

U.S. laws prohibit ADB activation at a vehicle speed less than a legal speed. Therefore, for example, when automatic braking for avoidance of contact with a target (e.g., a pedestrian or a vehicle) in front of an own vehicle is activated, if the vehicle speed becomes less than the legal speed, lighting of a headlamp is switched to low beam, which can cause a driver to lose sight of the front target.

In addition, while the ADB is in operation, if the vehicle decelerates before a curve such as a mountain road, and the vehicle speed becomes less than the legal speed, the lighting of the headlamp is switched to low beam, which can reduce the driver's front visibility in nighttime.

It is desirable to provide a headlamp control apparatus and a vehicle that make it possible to ensure a driver's front visibility in nighttime, even if ADB activation is restricted based on a traveling speed of the vehicle.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

Example Embodiment

A headlamp control apparatus 1 according to an example embodiment is described with reference to FIGS. 1 to 3.
[Configuration of Headlamp Control Apparatus 1]

As illustrated in FIG. 1, the headlamp control apparatus 1 is an apparatus that controls lighting of a headlamp of a vehicle, i.e., an own vehicle. The headlamp control apparatus 1 may include an imaging unit 10, a front vehicle detection unit 20, a front vehicle position calculation unit 30, a speed determination unit 40, a braking state detection unit 50, a headlamp control unit 70, and a headlamp unit 60.

The imaging unit 10 may include, for example, a monocular camera or a stereo camera. The imaging unit 10 may capture an image of a region in front of the own vehicle, and transmit the image to the front vehicle detection unit 20 to be described later.

The front vehicle detection unit 20 may detect a vehicle present in the region in front of the own vehicle, and transmit a result of the detection to the front vehicle position calculation unit 30 and the headlamp control unit 70 to be described later.

In one example, the front vehicle detection unit 20 may analyze the image received from the imaging unit 10, and detect whether a front vehicle, e.g., a preceding vehicle or an oncoming vehicle, is present in the region in front of the own vehicle.

When the front vehicle position calculation unit 30 receives, from the front vehicle detection unit 20, information indicating that a preceding vehicle or an oncoming vehicle has been detected in the region in front of the own vehicle, the front vehicle position calculation unit 30 may calculate position information of the detected preceding vehicle or oncoming vehicle, and transmit the position information to the headlamp control unit 70.

In one example, the front vehicle position calculation unit 30 may analyze the image received from the imaging unit 10, and calculate the position information of the preceding vehicle with respect to a reference position of the own vehicle. The reference position may be, for example, a position of a light source of the headlamp.

The speed determination unit 40 may detect a traveling speed of the own vehicle, determine whether the traveling speed has become less than a first speed and whether the traveling speed has become less than a second speed, and transmit a result of the determination to the headlamp control unit 70 to be described later.

The speed determination unit 40 may also detect the traveling speed of the own vehicle, determine whether the traveling speed has become greater than a third speed and whether the traveling speed has become greater than a fourth speed, and transmit a result of the determination to the headlamp control unit 70 to be described later.

In one example, the speed determination unit 40 may acquire a vehicle speed pulse, calculate the traveling speed of the own vehicle, and perform the speed determination.

Note that the first to fourth speeds will be described in detail later.

The braking state detection unit 50 may detect whether automatic braking for avoidance of contact with a target present in front of the own vehicle is currently in operation, and transmit a result of the detection to the headlamp control unit 70.

In one example, the braking state detection unit 50 may acquire information indicating an operation state of a brake from an unillustrated brake control unit, and detect whether the automatic braking is in operation.

The headlamp unit 60 may switch the lighting of the headlamp and illuminate the front of the vehicle, in accordance with a command from the headlamp control unit 70.

In one example, as illustrated in FIG. 2, the headlamp unit 60 may switch the lighting of the headlamp to any of low beam (i.e., passing beam), high beam (i.e., driving beam), and adaptive driving beam (ADB), in accordance with a command from the headlamp control unit 70 to be described later.

Figure 2A:
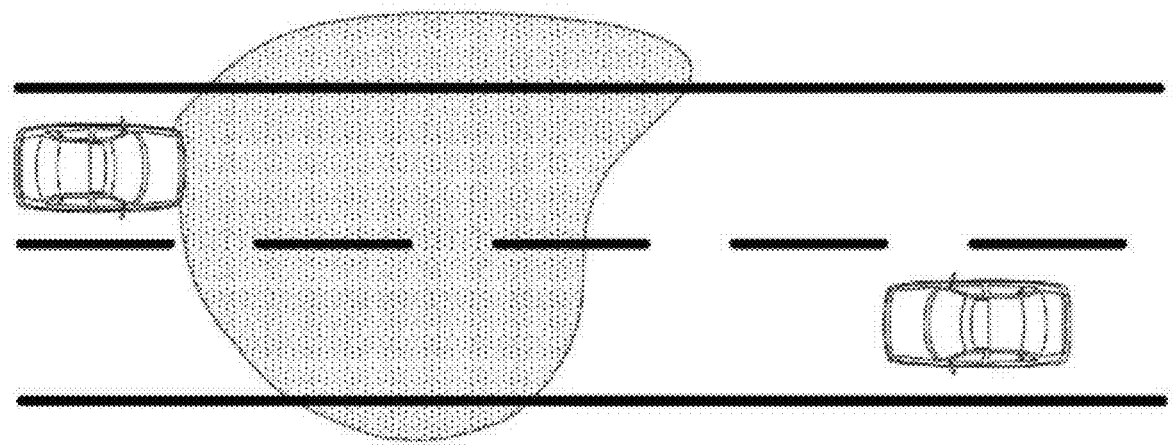
FIG. 2A is a diagram illustrating an example of a lighting pattern of a headlamp controlled by the headlamp control apparatus according to one example embodiment of the disclosure.

As illustrated in FIG. 2A, when the headlamp unit 60 illuminates the front of the vehicle with the low beam or passing beam, a driver who drives the vehicle is able to recognize, for example, a target that can hinder traffic, such as a preceding vehicle, an oncoming vehicle, or a person, that is present 40 meters ahead.

In other words, when the headlamp unit 60 illuminates the front of the vehicle with the low beam or passing beam, it is possible to prevent a driver of, for example, a preceding vehicle or an oncoming vehicle present in the region in front of the own vehicle from being dazzled, but it is difficult to recognize a remote target.

Figure 2B:
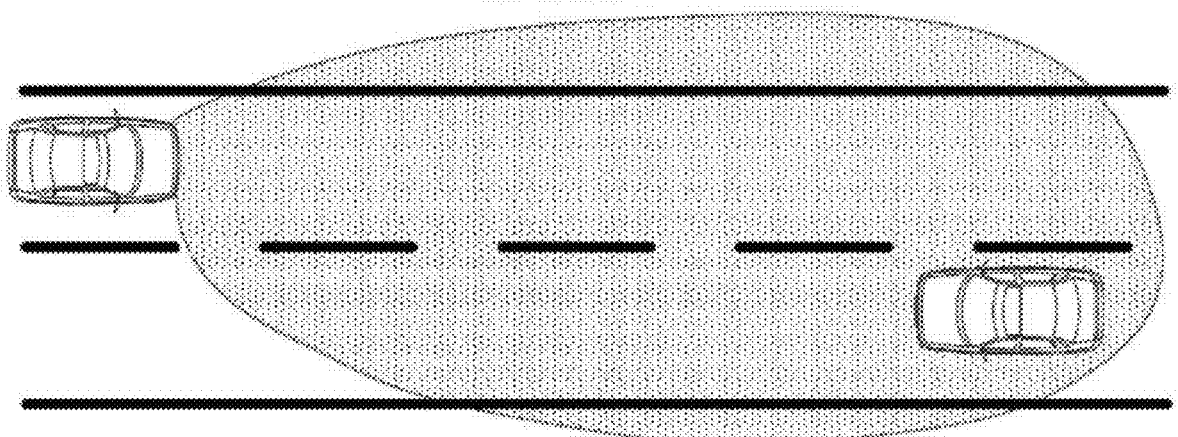
FIG. 2B is a diagram illustrating another example of the lighting pattern of the headlamp controlled by the headlamp control apparatus according to one example embodiment of the disclosure.

As illustrated in FIG. 2B, when the headlamp unit 60 illuminates the front of the vehicle with the high beam or driving beam, the driver is able to recognize, for example, a target that can hinder traffic, such as a preceding vehicle, an oncoming vehicle, or a person, that is present 100 meters ahead.

In other words, when the headlamp unit 60 illuminates the front of the vehicle with the high beam or driving beam, the driver is able to recognize a remote target, but a driver of a vehicle traveling in an illumination range is dazzled.

Figure 2C:
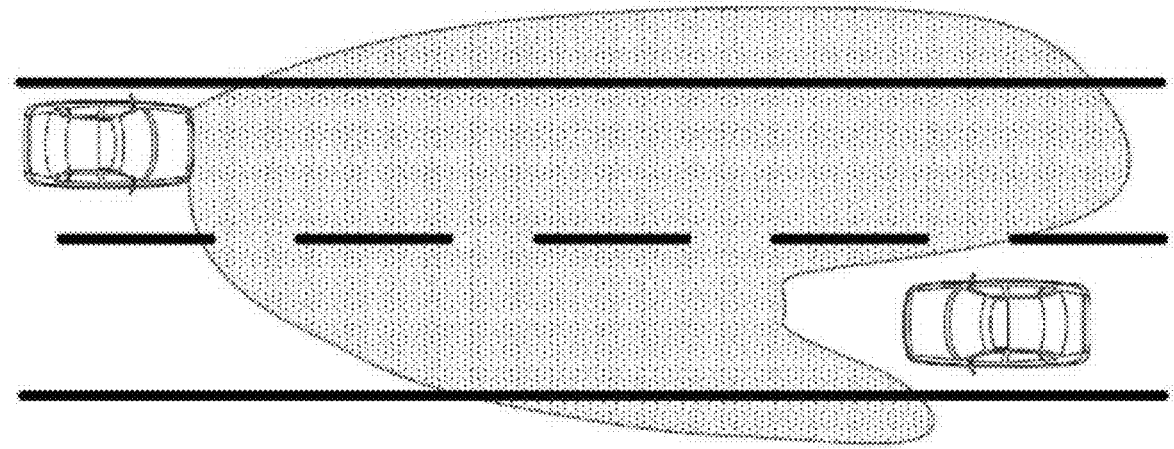
FIG. 2C is a diagram illustrating another example of the lighting pattern of the headlamp controlled by the headlamp control apparatus according to one example embodiment of the disclosure.

As illustrated in FIG. 2C, when the headlamp unit 60 illuminates the front of the vehicle with the ADB, light distribution of the headlamp may be controlled to prevent illumination light from reaching a position of a preceding vehicle or an oncoming vehicle traveling in front of the vehicle, and the driver is able to recognize, for example, a target that can hinder traffic, such as a preceding vehicle, an oncoming vehicle, or a person that is present 100 meters ahead.

In other words, when the headlamp unit 60 illuminates the front of the vehicle with the ADB, the driver is able to recognize a remote target, and it is possible to prevent a driver of a vehicle traveling in an illumination range from being dazzled.

Note that, when illuminating the front of the vehicle with the ADB, the headlamp control unit 70 may control the light distribution of the headlamp unit 60, based on the position information of the front vehicle detected by the front vehicle position calculation unit 30.

The headlamp control unit 70 may control overall operation of the headlamp control apparatus 1 in accordance with a control program stored in, for example, an unillustrated read only memory (ROM).

The headlamp control unit 70 performs control of the lighting of the headlamp unit 60, based on a result of detection by the front vehicle detection unit 20 and a result of determination by the speed determination unit 40.

The headlamp control unit 70 has a first mode and a second mode, as lighting modes of the headlamp.

While the lighting mode of the headlamp is the first mode, the headlamp control unit 70 performs control of, when a front vehicle is detected by the front vehicle detection unit 20, varying a region to be illuminated by the headlamp based on the position of the front vehicle, and performs control of switching the lighting of the headlamp to the high beam when no front vehicle is detected by the front vehicle detection unit 20.

While the lighting mode of the headlamp is the second mode, the headlamp control unit 70 performs control of switching the lighting of the headlamp to the low beam when a front vehicle is detected by the front vehicle detection unit 20, and switching the lighting of the headlamp to the high beam when no front vehicle is detected by the front vehicle detection unit 20.

In the first mode, when the speed determination unit 40 determines that the traveling speed of the own vehicle has become less than the first speed, the headlamp control unit 70 causes the control of the lighting to transition to the second mode.

The headlamp control unit 70 may further have a low beam mode as a lighting mode of the headlamp. While the lighting mode of the headlamp is the low beam mode, the headlamp control unit 70 may perform control of lighting the low beam.

[Processing by Headlamp Control Unit 70]

Processing by the headlamp control unit 70 is described in detail with reference to FIG. 3.

The headlamp control unit 70 may control the lighting of the headlamp unit 60 by causing the lighting mode of the headlamp to transition to any of the first mode, the second mode, and the low beam mode, based on the result of determination by the speed determination unit 40 and a result of detection by the braking state detection unit 50.

Figure 3:
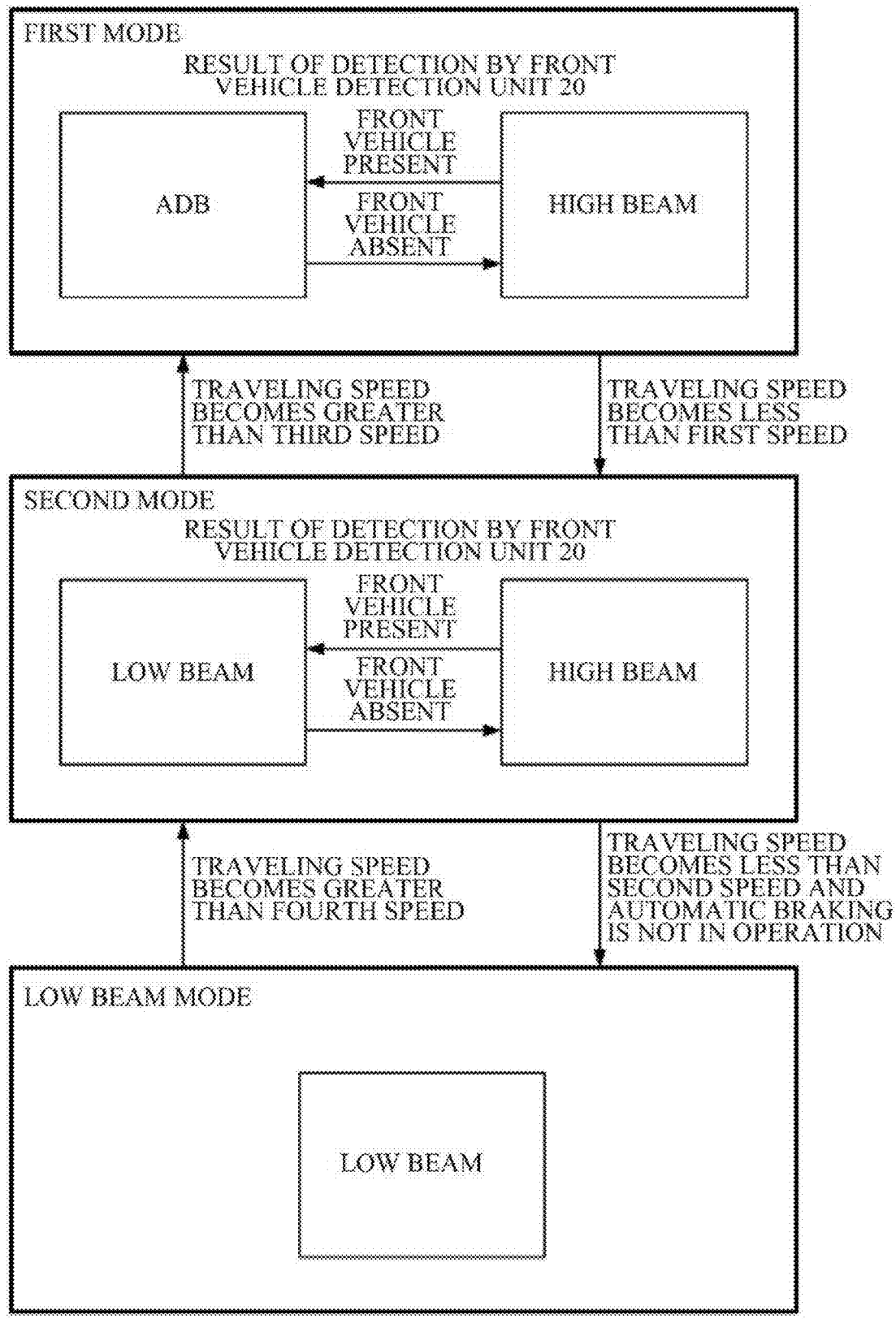
FIG. 3 is a diagram illustrating a relationship between a lighting mode and a traveling speed in the headlamp control apparatus according to one example embodiment of the disclosure.

As illustrated in FIG. 3, when the speed determination unit 40 determines that the traveling speed of the own vehicle has become greater than the third speed, the headlamp control unit 70 may cause the lighting mode to transition from the second mode to the first mode.

In a case where the lighting mode is set to the first mode, when information indicating that a vehicle has been detected in the front is received from the front vehicle detection unit 20, the headlamp control unit 70 may transmit a command for activation of the ADB to the headlamp unit 60.

When information indicating that no vehicle has been detected in the front is received from the front vehicle detection unit 20, the headlamp control unit 70 may transmit a command for lighting of the high beam to the headlamp unit 60.

When the speed determination unit 40 determines that the traveling speed of the own vehicle has become less than the first speed, the headlamp control unit 70 may cause the lighting mode to transition from the first mode to the second mode. When the speed determination unit 40 determines that the traveling speed of the own vehicle has become greater than the fourth speed, the headlamp control unit 70 may cause the lighting mode to transition from the low beam mode to the second mode.

In a case where the lighting mode is set to the second mode, when information indicating that a vehicle has been detected in the front is received from the front vehicle detection unit 20, the headlamp control unit 70 may transmit a command for lighting of the low beam to the headlamp unit 60.

When information indicating that no vehicle has been detected in the front is received from the front vehicle detection unit 20, the headlamp control unit 70 may transmit a command for lighting of the high beam to the headlamp unit 60.

When the speed determination unit 40 determines that the traveling speed of the own vehicle has become less than the second speed and the braking state detection unit 50 determines that the automatic braking is not in operation, the headlamp control unit 70 may switch the lighting mode to the low beam mode.

In a case where the lighting mode is set to the low beam mode, the headlamp control unit 70 may transmit a command for lighting of the low beam to the headlamp unit 60, regardless of the result of detection by the front vehicle detection unit 20.

When the speed determination unit 40 determines that the traveling speed of the own vehicle has become less than the second speed and the braking state detection unit 50 determines that the automatic braking is in operation, the headlamp control unit 70 may continue the second mode.

In other words, even if the automatic braking for avoidance of contact with a target (e.g., a vehicle or a person) present in front of the own vehicle is activated, and the traveling speed of the own vehicle is reduced to a speed less than the second speed, the headlamp control unit 70 may light the high beam when no front vehicle is present.

Note that the headlamp control unit 70 may continuously check the result of detection by the braking state detection unit 50, and cause the lighting mode to transition to the low beam mode upon a determination that the automatic braking has ended.

Here, description is given of setting values of the first to fourth speeds described above.

The setting value of the first speed may be set to, for example, a speed faster than a legal speed below which ADB activation is prohibited in the U.S., and the setting value of the third speed may be set to a speed faster than the first speed.

In other words, a predetermined speed difference may be set between the vehicle speed at which the lighting mode of the headlamp transitions from the second mode to the first mode, i.e., the third speed, and the vehicle speed at which the lighting mode of the headlamp transitions from the first mode to the second mode, i.e., the first speed.

The setting value of the second speed may be set to a speed slower than the legal speed, and the setting value of the fourth speed may be set to a speed faster than the second speed.

In other words, a predetermined speed difference may be set between the vehicle speed at which the lighting mode of the headlamp transitions from the low beam mode to the second mode, i.e., the fourth speed, and the vehicle speed at which the lighting mode of the headlamp transitions from the second mode to the low beam mode, i.e., the second speed.

Note that the setting value of the fourth speed may be set to a speed slower than the setting value of the third speed, and the setting value of the second speed may be set to a speed slower than the setting value of the first speed.

[Workings and Effects]

As described above, the headlamp control apparatus 1 according to the example embodiment may include the imaging unit 10, the front vehicle detection unit 20, the front vehicle position calculation unit 30, the speed determination unit 40, the braking state detection unit 50, the headlamp unit 60, and the headlamp control unit 70. The imaging unit 10 may capture an image of a region in front of the own vehicle. The front vehicle detection unit 20 detects a front vehicle present in the region in front of the own vehicle. The front vehicle position calculation unit 30 may calculate a position of the front vehicle. The speed determination unit 40 determines whether the traveling speed of the own vehicle has become less than the first speed. The braking state detection unit 50 may detect whether the automatic braking is in operation. The headlamp unit 60 may switch the lighting of the headlamp, and illuminate the front of the vehicle. The headlamp control unit 70 controls the lighting of the headlamp unit 60, based on the result of detection by the front vehicle detection unit 20 and the result of determination by the speed determination unit 40.

When the speed determination unit 40 determines that the traveling speed of the own vehicle has become less than the first speed, i.e., the speed corresponding to the legal speed below which ADB activation is prohibited, the headlamp control unit 70 causes the lighting mode of the headlamp to transition to the second mode. In the second mode, the headlamp control unit 70 transmits a command signal for lighting of the low beam to the headlamp unit 60 when a front vehicle is detected by the front vehicle detection unit 20, and transmits a command signal for lighting of the high beam to the headlamp unit 60 when no front vehicle is not detected by the front vehicle detection unit 20.

In other words, when the traveling speed of the own vehicle becomes less than the first speed, i.e., the speed corresponding to the legal speed below which ADB activation is prohibited, the high beam or the low beam is lit depending on presence or absence of a front vehicle.

Thus, even at a vehicle speed at which ADB activation is prohibited, a lighting state of the headlamp is set to the high beam when no front vehicle is present, which makes it possible to ensure the driver's front visibility in nighttime.

In addition, when a front vehicle is detected by the front vehicle detection unit 20, the headlamp control unit 70 sets the lighting state of the headlamp to the low beam, which makes it possible to prevent a driver of a preceding vehicle or an oncoming vehicle present in the region in front of the own vehicle from being dazzled.

When the vehicle is traveling on a curve such as a mountain road at a traveling speed faster than the first speed, even if the traveling speed of the own vehicle is reduced to a speed less than the first speed, i.e., the speed corresponding to the legal speed below which ADB activation is prohibited, before the curve, the lighting state of the headlamp is set to the high beam when no front vehicle is present. This makes it possible to ensure the driver's front visibility in nighttime.

While the ADB is in operation, even if the automatic braking for avoidance of contact with a target (e.g., a vehicle or a person) present in front of the own vehicle is activated, and the traveling speed of the own vehicle is reduced to a speed less than the first speed, i.e., the speed corresponding to the legal speed below which ADB activation is prohibited, the headlamp control unit 70 sets the lighting state of the headlamp to the high beam when no front vehicle is present. This makes it possible to prevent the driver from losing sight of the target in front of the vehicle.

This enables the driver to perform a driving operation for avoidance of contact with the target more accurately.

When the speed determination unit 40 determines that the traveling speed of the own vehicle has become less than the second speed and the braking state detection unit 50 determines that the automatic braking is not on operation, the headlamp control unit 70 may switch the lighting state of the headlamp to the low beam.

Thus, when the automatic braking is not in operation, the lighting state of the headlamp may be set to the low beam, which makes it possible to prevent a driver of the front vehicle from being dazzled.

When the automatic braking is in operation, the headlamp control unit 70 may continue the second mode, without causing the lighting mode of the headlamp to transition. The headlamp control unit 70 may accordingly set the lighting state of the headlamp to the high beam when no front vehicle is detected by the front vehicle detection unit 20, and set the lighting state of the headlamp to the low beam when a front vehicle is detected.

Thus, even if the automatic braking for avoidance of contact with a target (e.g., a vehicle or a person) present in front of the own vehicle is activated, and the traveling speed is reduced to a speed less than the second speed, the headlamp control unit 70 may set the lighting state of the headlamp to the high beam when no front vehicle is detected, which makes it possible to prevent the driver from losing sight of the target in front of the vehicle.

A predetermined speed difference or hysteresis may be set between the vehicle speed at which the lighting mode of the headlamp transitions from the second mode to the first mode, i.e., the third speed, and the vehicle speed at which the lighting mode of the headlamp transitions from the first mode to the second mode, i.e., the first speed.

A predetermined speed difference or hysteresis may be set between the vehicle speed at which the lighting mode of the headlamp transitions from the low beam mode to the second mode, i.e., the fourth speed, and the vehicle speed at which the lighting mode of the headlamp transitions from the second mode to the low beam mode, i.e., the second speed.

For example, the lighting mode may transition from the second mode to the low beam mode when the traveling speed of the own vehicle becomes less than the second speed. Thereafter, even if the traveling speed is immediately increased to a traveling speed greater than the second speed, the lighting mode may not transition from the low beam mode to the second mode until the traveling speed becomes greater than the fourth speed, because the predetermined speed difference is set.

This makes it possible to prevent hunting when the lighting mode transitions.

Modification Example 1

The headlamp control apparatus 1 described above detects the presence or absence of a front vehicle, and switches the lighting state of the headlamp. Another example may be to further detect a pedestrian in front of the own vehicle, and switch the lighting.

In other words, even if no vehicle is detected in front of the own vehicle, when, for example, a pedestrian walking in an opposite direction to the own vehicle is detected, the lighting of the headlamp may be switched to the low beam.

This makes it possible to prevent, for example, a pedestrian present in the region in front of the own vehicle from being dazzled.

Modification Example 2

The front vehicle detection unit 20 described above may detect the presence or absence of a vehicle, based on the image of the region in front of the own vehicle received from the imaging unit 10. In another example, the presence or absence of a vehicle may be detected using, for example, a light detection and ranging (LiDAR).

This makes it possible to accurately detect the presence or absence of a front vehicle traveling at a position remote from the own vehicle.

Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

As used herein, the term "collision" may be used interchangeably with the term "contact".

Each of the front vehicle detection unit 20, the speed determination unit 40, the braking state detection unit 50, and the headlamp control unit 70 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of each of the front vehicle detection unit 20, the speed determination unit 40, the braking state detection unit 50, and the headlamp control unit 70. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and an SRAM, and the nonvolatile memory may include a ROM and an NVRAM. The ASIC is an integrated circuit (IC) customized to perform, and the FPGA is an integrated circuit designed to be configured after manufacturing in order to perform, all or a part of the functions of each of the front vehicle detection unit 20, the speed determination unit 40, the braking state detection unit 50, and the headlamp control unit 70 illustrated in FIG. 1.

The invention claimed is:

1. A headlamp control apparatus to be applied to a vehicle, the headlamp control apparatus comprising:
a front vehicle detection unit configured to perform a detection of a front vehicle present in a region in front of the vehicle;
a speed determination unit configured to make a determination as to whether a traveling speed of the vehicle has become less than a first speed; and
a headlamp control unit configured to perform control of lighting of a headlamp of the vehicle based on a result of the detection by the front vehicle detection unit and a result of the determination by the speed determination unit, wherein
the headlamp control unit is configured to operate under a first mode and a second mode,
the first mode is a mode in which the headlamp control unit performs adaptive control of a beam pattern to vary an illuminated region of the headlamp based on a position of a detected front vehicle, and switches the lighting of the headlamp to a high beam when the front vehicle is not detected,
the second mode is a mode in which the headlamp control unit switches the lighting of the headlamp to a low beam when a front vehicle is detected, and switches the lighting of the headlamp to a high beam when no front vehicle is detected, wherein the second mode does not include control for varying the illuminated region of the headlamp based on a position of the front vehicle,
the headlamp control unit is configured to cause the control of the lighting to transition from the first mode to the second mode when, in the first mode, the speed determination unit determines that the traveling speed of the vehicle has become less than the first speed,
the headlamp control apparatus further comprises a braking state detection unit configured to detect whether automatic braking is in operation,
the speed determination unit is configured to further determine whether the traveling speed has become less than a second speed that is slower than the first speed, and
the headlamp control unit is configured to switch the lighting of the headlamp to the low beam, when the speed determination unit determines that the traveling speed of the vehicle has become less than the second speed and the braking state detection unit determines that the automatic braking is not in operation.

2. The headlamp control apparatus according to claim 1, wherein
the headlamp control unit is configured to cause the control of the lighting to transition to the first mode when the speed determination unit determines that the traveling speed of the vehicle has become greater than a third speed that is faster than the first speed, and cause the control of the lighting to transition to the second mode when the speed determination unit determines that the traveling speed of the vehicle has become greater than a fourth speed that is faster than the second speed,
a predetermined speed difference is set between the first speed and the third speed, and
a predetermined speed difference is set between the second speed and the fourth speed.

3. A vehicle comprising the headlamp control apparatus according to claim 2.

4. A vehicle comprising the headlamp control apparatus according to claim 1.

5. A headlamp control apparatus to be applied to a vehicle, the headlamp control apparatus comprising circuitry configured to
perform a front vehicle detection process of detecting a front vehicle present in a region in front of the vehicle, perform a speed determination process of determining whether a traveling speed of the vehicle has become less than a first speed, and perform control of lighting of a headlamp of the vehicle based on a result of the front vehicle detection process and a result of the speed determination process, wherein the circuitry is configured to operate under a first mode and a second mode, the first mode is a mode in which the circuitry performs adaptive control of a beam pattern to vary an illuminated region of the headlamp based on a position of a detected front vehicle, and switches the lighting of the headlamp to a high beam when the front vehicle is not detected, the second mode is a mode in which the circuitry switches the lighting of the headlamp to a low beam when a front vehicle is detected, and switches the lighting of the headlamp to a high beam when no front vehicle is detected, wherein the second mode does not include control for varying the illuminated region of the headlamp based on a position of the front vehicle, and the circuitry is configured to, upon, in the first mode, determining in the speed determination process that the traveling speed of the vehicle has become less than the first speed, cause the control of the lighting to transition from the first mode to the second mode when, in the first mode, the circuitry is configured to detect whether automatic braking is in operation, the circuitry is configured to further determine whether the traveling speed has become less than a second speed that is slower than the first speed, and the circuitry is configured to switch the lighting of the headlamp to the low beam, when the circuitry determines that the traveling speed of the vehicle has become less than the second speed and determines that the automatic braking is not in operation.

* * * * *